US010431996B2

United States Patent
Liu

(10) Patent No.: US 10,431,996 B2
(45) Date of Patent: Oct. 1, 2019

(54) SMART BATTERY, ELECTRIC ENERGY ALLOCATION BUS SYSTEM, BATTERY CHARGING AND DISCHARGING METHOD AND ELECTRIC ENERGY ALLOCATION METHOD

(71) Applicant: BEIJING SAMEVOLT CO., LTD., Beijing (CN)

(72) Inventor: Guangchen Liu, Beijing (CN)

(73) Assignee: BEIJING SAMEVOLT CO., LTD., Beijing (CN)

(*) Notice: Subject to any disclaimer, the term of this patent is extended or adjusted under 35 U.S.C. 154(b) by 0 days.

(21) Appl. No.: 15/684,942

(22) Filed: Aug. 24, 2017

(65) Prior Publication Data
US 2017/0353042 A1    Dec. 7, 2017

Related U.S. Application Data

(63) Continuation of application No. PCT/CN2016/074491, filed on Feb. 24, 2016.

(30) Foreign Application Priority Data

Feb. 24, 2015 (CN) .......................... 2015 1 0086383
Oct. 16, 2015 (CN) .......................... 2015 1 0667585

(51) Int. Cl.
*H02J 7/00* (2006.01)
*H01M 10/42* (2006.01)
(Continued)

(52) U.S. Cl.
CPC ....... *H02J 7/0026* (2013.01); *H01M 10/4257* (2013.01); *H01M 10/441* (2013.01);
(Continued)

(58) Field of Classification Search
CPC ............ H02J 7/0021; H02J 2007/0067; H02J 2007/0096
(Continued)

(56) References Cited

U.S. PATENT DOCUMENTS 5,450,321 A * 9/1995 Crane ................. B60R 16/0231
307/10.6
5,579,513 A * 11/1996 Strohmer ................. G04G 7/00
713/600
(Continued)

OTHER PUBLICATIONS

"Smart Battery Packs", http://www.epectec.com/batteries/, Epectec, Oct. 3, 2009.*

*Primary Examiner* — Drew A Dunn
*Assistant Examiner* — Harry O'Neill-Becerril
(74) *Attorney, Agent, or Firm* — Wayne & Ken, LLC; Tony Hom

(57) ABSTRACT

The present disclosure discloses a smart battery, an electric energy allocation bus system, a battery charging and discharging method and an electric energy allocation method. The smart battery internally comprises a battery body portion and a control unit. The smart battery can collect various data of the battery, can be communicated with other smart batteries in a battery pack of a same group and a battery pack control system, and can realize electric quantity transfer among smart batteries of the same group through the electric quantity allocation bus, and realize electric quantity transfer among some batteries of a battery pack accessed to the electric energy allocation bus. Besides, controllable processes of charging and discharging, that is, active balanced charging and discharging, can be realized.

3 Claims, 12 Drawing Sheets

(51) Int. Cl.
*H01M 10/44* (2006.01)
*H01M 10/48* (2006.01)

(52) U.S. Cl.
CPC ......... *H01M 10/482* (2013.01); *H02J 7/0014* (2013.01); *H02J 7/0018* (2013.01); *H01M 2010/4271* (2013.01); *H02J 2007/0098* (2013.01)

(58) Field of Classification Search
USPC .......................................................... 320/112
See application file for complete search history.

(56) References Cited

U.S. PATENT DOCUMENTS

| | | | |
|---|---|---|---|
| 6,356,055 B1 | 3/2002 | Lin et al. | |
| 2002/0062454 A1* | 5/2002 | Fung | G06F 1/3203 713/300 |
| 2004/0199351 A1* | 10/2004 | Ott | G05B 9/02 702/108 |
| 2005/0001625 A1* | 1/2005 | Ashtiani | G01R 31/3679 324/426 |
| 2009/0119038 A1* | 5/2009 | Bell, Jr. | B60L 3/12 702/62 |
| 2010/0052615 A1* | 3/2010 | Loncarevic | H02J 7/0016 320/118 |
| 2010/0301807 A1* | 12/2010 | Gamboa | H01M 2/0245 320/118 |
| 2011/0100735 A1* | 5/2011 | Flett | B60K 6/46 180/65.22 |
| 2013/0300371 A1* | 11/2013 | Bills | H02J 7/0016 320/118 |
| 2014/0285010 A1* | 9/2014 | Cameron | H02J 1/14 307/29 |
| 2014/0312848 A1* | 10/2014 | Alexander | H02J 7/0013 320/134 |
| 2015/0227127 A1* | 8/2015 | Miller | G05B 19/042 700/244 |

\* cited by examiner

SMART BATTERY, ELECTRIC ENERGY ALLOCATION BUS SYSTEM, BATTERY CHARGING AND DISCHARGING METHOD AND ELECTRIC ENERGY ALLOCATION METHOD

TECHNICAL FIELD

The present invention relates to the technical field of electric energy allocation of power systems of battery packs, and particularly relates to a smart battery, an electric energy allocation bus system, a battery charging and discharging method and an electric energy allocation method.

BACKGROUND

Battery inconsistency is a problem which always cannot be completely solved in current battery applications, particularly battery group applications.

Batteries are generally used in groups, several and dozens of batteries are used in groups at least, and hundreds of or even thousands of batteries are used in groups. The inconsistency among various batteries in a battery production link absolutely exists due to multiple factors such as a manufacturing process problem, material non-uniformity, incompletely identical density/mass of energy storage substances and the like. In a battery using link, an environmental temperature of each battery during charging and discharging is different due to non-uniformity of heat fields during charging and discharging of battery packs since batteries have different positions in the battery packs after the batteries are packed. The inconsistency may be gradually enlarged and even out of control in the battery using link, i.e., out-of-control overcharge and undercharge may occur during charging, and an overdischarge phenomenon of partial batteries is intensified during discharging. A discharge depth of each battery in the battery pack is inconsistent, wherein one part of batteries may be in an overdischarge state, and partial available remaining electric quantity is not used in the other part of the batteries, so that overall discharge capacity of the battery pack is decreased and overall cycle life of the battery pack is accelerated to decrease along with decrease of cycle life of one part of batteries with a maximum discharge depth, thereby causing early scrap of the battery pack. However, part of batteries in an available state are scraped together to cause waste when the whole battery pack is replaced.

In addition, overcharge even may cause explosion and fire accidents.

Therefore, an existing battery pack power system needs to be equipped with a battery management system. A current battery management system has two technical solutions for eliminating inconsistency of the batteries (i.e. balancing of the battery pack). One solution is an energy-consuming type solution, i.e., externally connecting a battery with the maximum remaining electric quantity with a resistor to reduce the remaining electric quantity of the battery. The other solution is an electric energy transfer solution among batteries, i.e., performing electric energy transfer among the batteries and charging a battery with the minimum remaining electric quantity by using the battery with the maximum remaining electric quantity or charging the battery with the minimum remaining electric quantity by using the battery pack and a DC-DC converter. Defects of the former solution are as follows: energy of the batteries is wasted, endurance of the battery pack is reduced and the heat field of the battery pack is more non-uniform and unexpected, while the latter solution cannot be implemented without the DC-DC converter. However, extra electric energy consumption of the battery pack is increased due to conversion efficiency of the converter.

For a battery pack power system equipped with various power generation devices, usage of the power generation devices is basically at a high-voltage level for converting an output voltage of the power generation devices into a battery pack voltage, and then the battery pack is charged. Due to the inconsistency of the batteries, the electric quantity charged into each battery is unbalanced, and then the batteries are subjected to various balancing by using an existing balancing technology, causing electric energy waste. Particularly for a movable or offline battery pack power system, the electric energy waste means decrease of endurance of the battery pack.

Due to the existence of the inconsistency of the batteries, batteries of the same brand, the same specification, the same batch and the same sorting standard may be selected as much as possible during sorting and packing of the batteries to reduce inconsistent indexes among the batteries as much as possible, thereby increasing sorting cost of the battery pack and further increasing purchasing cost of the battery pack.

In recent years, a charging apparatus for independently charging the batteries in the battery pack appears. Although the apparatus is not popularized and applied on a large scale, a qualitative difference is made compared with a former traditional series charging technology in general application. Tests discover that the above independent charging apparatus and technology still have defects as follows: a discharge link cannot be controlled, and all batteries in the battery pack cannot be guaranteed to have the same discharge depth; as a certain distance exists between a charger and the battery pack, line diameter specifications and quantities of charging lines are correspondingly increased; laying (including shielding) of high-current charging lines and data collection lines increases an extra space, cost and unsafe factors; and moreover, a long-distance data collection line reduces data collection precision.

An existing charging method generally takes "full charging" as a single objective, and under the objective, due to the inconsistency among the batteries, the traditional series charging manner may cause that some batteries in the battery pack are in overcharge and overdischarge states during charging or discharging. When the battery pack is charged by using a charger capable of independently charging each battery, an overcharge phenomenon of the battery pack can be avoided, while a phenomenon that some batteries have a large relative discharge depth, i.e. a relative overdischarge phenomenon, in the discharging process still cannot be avoided.

A Chinese patent literature with an application publication number of CN102214938A discloses a charging control method for a rechargeable battery used for a portable computer. The charging control method comprises: acquiring a charging current control parameter of the rechargeable battery; modifying charging current of the rechargeable battery from a first charging current to a second charging current smaller than the first charging current according to the charging current control parameter; and charging the rechargeable battery by using the second charging current, thereby prolonging service life of the rechargeable battery.

A Chinese patent literature with an application publication number of CN104052136A discloses a battery pack, a charging circuit and a charging apparatus.

The battery pack comprises battery blocks and a memory, wherein the battery blocks comprise battery cells; the memory stores battery information; the battery information comprises lower limit voltages of the battery blocks set according to models of the battery blocks; the charging circuit comprises a voltage measurement unit and a control unit; and the voltage measurement unit is configured to measure inter-terminal voltages of the battery blocks, and the control unit is configured to control charging according to the inter-terminal voltages measured by the voltage measurement unit.

A Japanese patent literature with an application publication number of JP2008-220110 relates to a battery pack, a charging method and a charging system. Charging current specified by a charging voltage specified value is decreased under conditions that a maximum battery cell voltage in battery cell voltages measured from each of a plurality of battery cells is compared with a full charging voltage and the maximum battery cell voltage is higher than the full charging voltage. In addition, the charging current specified by the charging voltage specified value is increased under conditions that the maximum battery cell voltage and the full charging voltage are compared and the maximum battery cell voltage is smaller than the full charging voltage. Charging of a degraded battery to an overcharge area is prevented by using a charging method for periodically controlling during a charging period when such a charging voltage specified value is changed.

An international patent with an application publication number of WO2013/173195 discloses a charging system of a battery pack for an electric vehicle. The charging system comprises: a charging station electrically coupled to the battery pack, and configured to transfer charging energy to an energy storage system in a first operating mode at a maximum quick charging rate and transfer the charging energy to the energy storage system in a second operating mode at a lower charging rate; a data collection system, configured to acquire a set of data indicating state of charge (SOC) of the battery pack and one or more expected charging optimization parameters; and a station control, configured to respond to the set of the data and the expected charging optimization parameters and automatically establish a charging configuration file used for the battery pack to enable a control signal to be effective and operate the charging station in the second operating mode or enable the control signal to be effective and operate the charging station in the first operating mode.

SUMMARY OF THE PRESENT INVENTION

Influences brought by the inconsistency of the batteries in the battery pack cannot be completely solved in the above technical solutions. Either overcharge or overdischarge or various wastes of electric energy are caused in charging and discharging processes and battery balancing process, causing that the endurance of the battery pack is decreased. Charging and discharging cycles of the batteries are increased by the electric energy conversion in the balancing process and the partial charging process, overall life of the battery pack is shortened, and sorting cost of the battery pack is increased while the sorting standard of the batteries during packing is increased as much as possible.

The present invention provides a smart battery, an electric energy allocation bus system, a battery charging and discharging method and an electric energy allocation method. A technical solution of the present invention overcomes defects of the prior art, so that each battery is individually controlled and integrally adjusted smartly in charging and discharging processes, so as to fundamentally solve problems of overcharge and overdischarge of partial batteries in the battery pack in the charging and discharging processes due to inconsistent batteries, reduce charging and discharging cycles of the battery pack and greatly reduce standards during battery sorting and grouping, thereby obviously prolonging the total cycle life of the battery pack, reducing electric energy waste in the charging and discharging processes and a balancing process of the battery pack, increasing endurance of the battery pack and reducing sorting and purchasing cost of the battery pack.

In a first aspect of the present invention, the present invention provides a smart battery comprising a battery body portion, a control unit, a connecting line, a sensor and a shell. The smart battery is made in a manner of additionally installing the control unit on a traditional battery, thereby completing collection of various data of the battery and controllable charging and discharging. The smart battery of the present invention is for independent use, use in series groups or use in series-parallel mixed groups.

The control unit is configured to control coordinately, acquire information, analyze statistic, control actively and give external feedback, i.e., coordinating and controlling cooperative work of all batteries in the same battery group and connected power generation devices/electrical loads, acquiring various information of all the batteries/devices in the group, performing statistic analysis and computation on the above acquired information, further adjusting charging parameters between the batteries and the devices in the group, and control of electric quantity reallocation and the like, and simultaneously performing passive feedback to external commands and actively reporting information to the outside.

More specifically, when controlling coordinately, the control unit coordinates and controls cooperative work of other smart batteries in a battery pack and power generation devices or electrical loads accessed to a same electric energy allocation bus through a communication interface, including: keeping clocks of all smart batteries synchronous and keeping synchronous with a clock of a superior control system of the battery pack, coordinating and determining a control unit of a certain smart battery in the battery pack as a control core of the entire battery pack, coordinating data collection and transmission of other smart batteries, coordinating calibration of data collection precision of all the batteries in the battery pack, controlling data collection types and frequencies of all batteries, upgrading programs of the control unit, and performing self-tests of the control unit of each battery.

When acquiring information, the control unit is further configured to: acquire information of the battery, including voltage, current, internal resistance, temperature, environmental temperature, motion states, vibration and acceleration data through a data collection function of the control unit, acquire above information of each of other smart batteries in the same group and clock/self-testicalibration information through a communication function of the control unit, acquire voltage/current data on the electric energy allocation bus, acquire external interaction commands and environmental temperature information through the communication function of the control unit, and add time stamps on all above information and store the information.

When analyzing the statistic, the control unit is configured to count, analyze and compute the number of charging and discharging cycles of each battery in the battery pack, charging and discharging depth, remaining electric quantity and deterioration degree according to the acquired information, compute charging parameters suitable for each battery according to commands, compute power supply and electricity use information accessed to the electric energy allocation bus for switching different batteries and/or power generation devices and/or electrical loads to access to the electric energy allocation bus or disconnect from the electric energy allocation bus, and add time stamps on all above information and stores the information.

When control actively, the control unit is configured to perform electric quantity transfer among the batteries belonging to a same group to realize a reallocation of the remaining electric quantity among all the batteries, or to charge partial or all the batteries in the battery pack through the power supply devices accessed to the electric energy allocation bus, switch corresponding batteries and/or power generation devices and/or electrical loads to access to the electric energy allocation bus or disconnect from the electric energy allocation bus according to a statistic analysis result; the control unit is configured to adjust charging parameters dynamically based on a statistic analysis computation result and the external commands.

When giving external feedback, the control unit passively answers the external interaction commands or actively issues information to an outward.

The control unit comprises a main control module, a storage module, a collection module, a charging module, an electric quantity transfer module, a communication module and an interaction module.

Further, the main control module has the functions of coordinating cooperative work of various modules of the smart battery, coordinating work of all modules of other smart batteries in the same group and connected power generation devices/electrical loads through a communication interface, communicating with a superior control system of the battery pack, reporting the data of the battery pack, and receiving and executing commands of the superior control system of the battery pack. The main functions of the main control module are described as follows:

1. The main control module comprises a processor and a program, and realizes main functions of: counting and computing the number of charge-discharge cycles, a charge-discharge depth, a degradation degree and a relative degradation degree of each battery in the battery pack according to the read charging and discharging data of the battery, the received charging and discharging data of each battery in the battery pack and commands of a superior control system of the battery pack; computing charging parameters suitable for the battery and other batteries in the battery pack and transmitting the charging parameters to a charging unit of the battery or transmitting the charging parameters to other batteries through communication interfaces; dynamically adjusting the charging parameter of each battery in the battery pack according to the received real-time data of each battery in the battery pack, the commands of the superior control system and commands from the interaction module and transmitting the charging parameters to charging modules of other batteries in the battery pack, or receiving commands and charging parameters transmitted by main control modules of other smart batteries in the same group to drive the charging module of the battery to work; starting the electric quantity transfer module at proper time according to remaining electric quantity data of each battery in the battery pack, thereby realizing electric quantity transfer among the batteries in the battery pack; analyzing the relative degradation degree of each battery according to data of each battery in the battery pack, such as the number of cycles, the charging and discharging depths, the degradation degree, the remaining electric quantity and the like, and reporting to the superior control system of the battery pack; controlling data collection types and collection frequencies of the collection module; reading data in the storage modules of the battery and the other batteries; and correcting offset of each collection module in the same group during calibration. The program can be upgraded, wherein upgrading manners comprise upgrading through program upgrade interfaces (such as USB or TF cards and other storage cards) of the battery and upgrading through the communication module by virtue of the superior control system of the battery pack; and after one battery is upgraded, the main control modules of the other smart batteries in the same group can be upgraded, or control of the main control modules of other smart batteries in the same group is accepted to realize program upgrade.

2. The main control module is provided with an isolating circuit used for isolating the collection module and the charging module.

3. The main control module is provided with a real-time clock, and the clock can be calibrated in real time in communication with the other smart batteries and the superior control system of the battery pack, thereby keepingthat clocks in the battery pack and the superior control system of the battery pack are consistent.

4. The main control module is provided with a gyroscope chip which can sense motion states of the batteries, such as current accelerations and the like, or can acquire motion states of the battery pack, such as a speed, an acceleration and the like, by virtue of communication between the gyroscope chip and the superior control system of the battery pack.

5. The main control module has an environmental temperature collection function, can collect the environmental temperature through a temperature sensor installed on the module or outside the battery, or can acquire environmental temperature data by virtue of communication with the superior control system of the battery pack.

6. The main control module has a self-test function and can report a self-test result to the superior control system of the battery pack.

7. The main control module is provided with a heating/cooling interface capable of issuing a heating/cooling signal to outside, such as a control system on the battery pack or additional heating/cooling equipment, and controlling the heating/cooling equipment outside the smart battery to heat/cool the total or partial batteries of the battery pack, so that all the batteries are operated at a proper temperature.

8. The main control module of a certain smart battery can be automatically allocated to serve as a main control module of the whole battery pack when the smart batteries are used in a group, thereby coordinating the operation of all modules of the whole battery pack; and in a preferred embodiment, only one smart battery is equipped with the main control module in the whole battery pack to save cost.

Further, the storage module has the function of storing the following information: partial or all information of a brand/type/manufacturing date/serial number/quality inspection number of the smart battery, charging and discharging data information including voltage/current/internal resistance/temperature and the like collected by the collection module of the battery during charging and discharging, information received by the communication interface and information stored by the main control module. All of the above information has time stamps for invoking.

Further, the collection module has the functions of executing the commands of the main control module or the commands from the communication module, collecting various data of the battery, such as voltage/current/internal resistance/temperature and the like according to specified collection frequency and collection kind, adding time stamps and storing into the storage module for reading. The collection module has a calibration function. The calibration interface is used to calibrate data collection accuracy of the collection module and correct collection offset to ensure consistency of data collection standards of all the batteries in the same group.

Further, the charging module has the functions of executing a charging command issued directly by the main control module or received by the communication module, charging the batteries according to supplied charging parameters, and adjusting the charging parameters in real time according to received latest charging parameters. Under the control of the main control module, the charging module can be cooperated with other batteries or power generation/power supply devices accessed to the electric energy allocation bus system to receive the electric energy to charge the battery. Electric isolation is made between input and output of the charging module, and the same power generation device can be adopted for simultaneously charging partial or all batteries in the battery pack with a potential relationship. The charging module selects corresponding heat dissipation devices such as natural cooling/fan cooling/liquid cooling and the like according to different powers. An overload protection apparatus is installed on the charging circuit. The charging module is connected with a power supply through a power supply interface installed on the shell.

A full-time charging mode or a time-sharing charging mode can be selected according to battery capacity when the smart battery is manufactured, so as to control weight, volume and cost of the charging module. Therefore, the control unit adopts a full-time charging mode or a time-sharing charging mode; the full-time charging mode is to complete charging by the control unit in an entire charging process, and the time-sharing charging mode is to complete the entire charging process through traditional series charging and charging of the control unit in a relaying manner.

In the full-time charging mode, power of the charging module meets the maximum charging power need of the battery, and the battery is charged by the charging module in the entire process. In a high-capacity smart battery, if a full-power charging module is matched, the power and heat dissipation requirement of the charging module may increase the weight, the volume, the cost and the like of the charging module.

In the time-sharing charging mode, the power of the charging module is decreased, such as reduced to ⅓ of the full power, thereby decreasing the weight, the volume and the cost of the charging module. The battery pack is subjected to full-power charging during initial charging by adopting the traditional series charging manner, and a state of each battery is monitored. Along with increase of the electric quantity in the battery, when the charging power is gradually decreased to a power range of the charging module, or when a charging parameter of a certain battery is close to a critical value of the charging parameter of the battery, if a charging voltage of the certain battery is close to a charging voltage which shall be adopted by the battery and computed by the main control module, outside high-power series charging is stopped, and the charging module of the battery is used for charging. At this moment, the time-sharing charging mode does not lose control of the control unit on key charging parameters (such as conversion voltage and current/floating charging voltage and current, and the like) of the battery, so that a charging effect is completely controllable, and the weight, the volume and the cost can be decreased.

Further, the electric quantity transfer module has a function of externally supplying power by using the electric energy of the battery under control of the main control module or under control of the commands received by the communication module, such as charging the other batteries or supplying power to other electrical loads. Power and time of external power supply are controllable. The electric energy of the battery is used for charging the other batteries. Controllable changeover switches and isolating elements, such as isolating transformers or electric energy conversion/transfer elements with indirect contact type input ends and output ends are arranged in the electric quantity transfer module.

Herein, the cooperative work of realizing electric energy (electric quantity) transfer by the main control module, the charging module and the electric quantity transfer module is briefly introduced. The main control module can transfer electric energy of a certain battery in the battery pack to other batteries as required, i.e., one battery in the battery pack is used for charging another battery. In other words, in the same battery pack, regardless of series charging/standby/discharging states of the battery pack, the electric quantity transfer can be realized between two batteries with a potential relationship, or all or partial batteries are charged by using the power generation devices, or a certain battery is used for individually externally supplying power. A specific process of realizing the electric quantity transfer will be further described in a technical solution portion about the electric energy allocation bus system in the description.

The charging module and the electric quantity transfer module are arranged in a parallel circuit between the main control module and the battery body portion.

The main control module, the charging module, the communication module and the electric quantity transfer module are separate and distinct.

Further, the communication module has the functions of transmitting data between smart batteries of the same group, between the battery pack and the superior control system of the battery pack and between other power generation devices or electrical loads accessed to the communication buses and the smart battery. Because a potential relationship exists among the batteries in the same group, electrical isolation must be made between the communication module and other modules. The communication module can support a standard wired or wireless bidirectional communication manner and select different standards such as WIFI/Bluetooth/RS485/CAN and the like according to different application occasions. The communication module is connected with other smart batteries in the same group, the superior control system of the battery pack, the power generation devices or the electrical loads through communication interfaces installed on the shell.

The communication module can perform bidirectional communication with all the smart batteries in the same group and the superior control system of the battery pack to exchange data through the control unit, and the electric quantity transfer among the batteries can be realized after grouping. A charging method capable of dynamically adjusting the charging parameters is adopted during charging, and a discharging method capable of realizing the electric quantity transfer among the batteries is adopted during discharging, thereby achieving balanced charging and discharging of non-overcharge during charging and non-overdischarge during discharging. Moreover, when the power generation devices are accessed to the electric energy allocation bus system, the partial or all batteries can be charged additionally, thereby increasing discharge capacity of the battery pack.

Further, the interaction module has the functions of displaying/setting states/parameters and the like of the smart batteries and has corresponding input keys. A manner of a display screen+keys can be adopted, and a touch screen with an input function can also be adopted. The interaction module can select a proper configuration manner according to application environments, power consumption and cost of the batteries, even can be canceled.

The above main control/storage/collection/charging/electric quantity transfer/communication/interaction modules and the like may be multiple separate circuit boards and can be integrated on one circuit board. Each module can be subjected to proper configuration reduction according to actual using needs to reduce the cost. A smart battery with the minimum configuration only comprises a charging module, and at this moment, a charging parameter of the smart battery is a preset charging parameter matched with the battery body.

Power supply of the control unit can support power supply of the battery body portion, power supply of an auxiliary power supply (an additional rechargeable battery) or external power supply. The batteries included in the auxiliary power supply can be charged while the smart batteries are charged and can share a power supply of a power supply port with the charging module during external power supplying.

The battery body portion of the smart battery may be a battery, a battery cell or a battery pack composed of a plurality of battery cells, i.e., the battery body portion can be formed by connecting 1 battery or more than 1 battery in parallel. When the battery body portion is a lithium battery, the control unit can replace a protection circuit inside the lithium battery for saving cost. An installation position of a temperature sensor is reserved at the battery body portion to improve measurement accuracy.

Further, the connecting lines and the sensor in the smart battery, and a positive leading wire and a negative leading wire of the battery body portion are respectively connected with a positive binding post and a negative binding post of the shell of the smart battery. An overload protection apparatus, such as a fuse, and a current sensor, such as a diverter, are installed on the connecting circuit. The overload protection apparatus can avoid causing a secondary accident due to a short circuit of the battery when the battery fails and generates urgent situations such as traffic accidents. Specifications of the overload protection apparatus and the current sensor satisfy requirements of maximum charging and discharge current of the battery and have redundancy. A positive output end and a negative output end for the charging function, such as a positive output end and a negative output end of the charging module, and an input end for the electric quantity transfer function, such as an input end of the electric quantity transfer module, in the control unit are respectively connected with the positive leading wire and the negative leading wire of the battery body portion. The current sensor, such as the diverter, is installed on the connecting circuit and used for collecting the charging current.

Further, the shell of the smart battery may be an integrated or split shell. The control unit, the battery body portion, the connecting line and the sensor are combined together. The shell is provided with exposed positive binding post and negative binding post and a plurality of interfaces, including partial or all interfaces such as an environmental temperature sensor interface/a power supply interface/an electric energy allocation bus interface/a heat dissipation interface/a calibration interface/an interface of an interaction interface/a communication interface/a program upgrade interface. All of the above interfaces may be respectively independent or a plurality of interfaces are combined into one interface. A proper protection grade, such as IP65 and the like, is adopted among all the interfaces, the control unit and the battery body portion. When a lead-acid battery is adopted by the battery body portion, a vent hole or a vent valve is reserved on the shell. The entire shell or a shell of the control unit portion can be shielded.

In one embodiment, all circuit boards of the control unit are subject to low power consumption design and corresponding protection treatment according to application environments of the battery.

In one embodiment, the control unit and the battery body portion are designed to be detachable, which is convenient for maintenance, replacement and reuse.

All the connecting lines among the modules, the interfaces, the battery body portion, the sensor and the smart battery binding posts of the control units in the smart battery are firmly connected. Line diameter specifications of the connecting lines satisfy a power requirement and have certain redundancy. Some connecting lines are shielded.

In a second aspect of the present invention, the present invention provides an electric energy allocation bus system (hereinafter referred as "bus") used for electric energy allocation in a power system of a battery pack and comprising one or more pairs of electric energy allocation buses. One or more smart batteries, one or more power generation or power supply devices and one or more electrical loads are connected to realize controllable electric quantity transfer among the batteries, the power generation devices and the electrical loads in an offline or online state, i.e., realize controllable electric energy transfer between the batteries and the devices or between the devices, wherein electric energy transfer between the batteries and the devices comprises two electric energy transfer modes such as a "valley filling" mode and a "peak clipping" mode:

The "valley filling" mode is electric energy transfer between the batteries and the power generation devices or power supply devices. The power generation devices or the power supply devices and a battery with a minimum remaining electric quantity or a specified battery in the battery pack are simultaneously accessed to the buses of the same group, i.e., the battery with the minimum remaining electric quantity or the specified battery in the battery pack is charged by using the power generation devices or power supply devices, thereby achieving a purpose of balancing the battery pack, charging the electric energy supplied by the power generation devices into the battery pack, increasing the remaining electric quantity of the battery pack and avoiding extending inconsistency among the batteries due to a traditional series charging mode.

The "peak clipping" mode is electric energy transfer between the batteries and the electrical load devices. A battery with a maximum remaining electric quantity or a specified battery in the battery pack and an electrical load device are simultaneously accessed to the buses of the same group, i.e., the electrical load is powered by the battery with the maximum remaining electric quantity or the specified battery in the battery pack, thereby achieving a purpose of balancing the battery pack, and simultaneously meeting an electricity use need of the electrical load.

Electric energy transfer between the devices is called as a "direct power supply" mode. The power generation device or the power supply device and the electrical load are simultaneously accessed to the buses of the same group, i.e., the electrical load is directly powered by using the power generation device or the power supply device, thereby avoiding cumbersome steps of firstly charging the battery pack, converting high voltage of the battery pack into low voltage and supplying power to the electrical load by the power generation device, avoiding an energy loss caused by conversion between electric energy and chemical energy and an energy loss caused by conversion from high voltage to low voltage of electric energy and reducing charging and discharging cycles of the batteries so that the life of the battery pack can be prolonged and endurance of the battery pack can be increased.

The above three electric energy allocation modes of peak clipping, valley filling and direct power supply can be mixed and applied in a same power system of the battery pack. A plurality of groups of electric energy allocation buses can be used in the same power system of the battery pack to increase the efficiency of electric energy allocation.

Further, smart batteries or ordinary batteries can be used in the electric energy allocation buses, i.e., a battery information collection system is configured in the entire power system of the battery pack. On a premise that information such as voltage, current, temperature and the like of each battery is collected, the smart batteries can be replaced with the ordinary batteries.

Further, an input end of power supply conversion devices of DC-DC, AC-DC and the like can be regarded as an electrical load device, i.e., has a feature of electric energy consumption. An output end of the power supply conversion devices can be regarded as a power generation device or power supply device, i.e., has a feature of external power supply.

Further, in the electric energy allocation bus system, the number of the batteries is 1 or more than 1; the number of the power generation devices or the power supply devices is 0, 1 or more than 1; and the number of the electrical loads is 0, 1 or more than 1.

Further, one or more pairs of wires of the electric energy allocation bus system are connected to a power supply interface (such as the above electric quantity transfer module of the smart battery) or a power receiving interface (such as the above charging module of the smart battery) of all the smart batteries or devices accessed to the buses.

Further, the smart battery accessed to the bus shall at least comprise one of a function of supplying power to the bus and a function of charging by using the electric energy of the bus. On a premise that the power system of the battery pack can collect data such as voltage, current, temperature and the like of each battery, the smart battery can be replaced with the ordinary battery.

Further, the power generation device or power supply device shall have a function of supplying power to the buses.

Further, the electrical load shall have a function of realizing a specific objective by using electric energy of the buses.

Further, all the batteries, the power generation devices or the electrical loads accessed to the electric energy allocation bus system have switches under unified coordination and control to realize electrical connection with or disconnection from the buses. Or, the smart batteries, the power generation devices or the electrical loads do not have the above switches, but lines accessed to the buses have switches under unified coordination and control to control electrical connection with or disconnection from the buses.

Further, the control system for coordinating whether each device accessed to the buses is connected with or disconnected from the buses may be an individual bus control system, or one of the smart batteries/power generation devices/electrical loads accessed to the buses having the control function is used for coordination and control.

Further, when the number of the batteries or devices accessed to the buses is large, a method of increasing the number of electric energy allocation bus groups can be adopted to increase the efficiency of electric quantity transfer. If a plurality of groups of electric energy allocation buses are equipped, a plurality of paths of corresponding change-over switches need to be allocated in the batteries/devices accessed to the buses to access different electric energy allocation buses.

In one embodiment, a basic electric energy transfer mode 1 of an electric energy allocation bus system: a "valley filling" mode is provided, i.e., a battery with the minimum remaining electric quantity in the battery pack is charged by using the power generation device through the electric energy allocation bus. When the power generation device can provide electric energy, it is assumed that the main control module judges that No. 2 battery has the minimum remaining electric quantity, and decides to charge the No. 2 battery by the power generation device. The main control module controls whether each battery and device is accessed to the electric energy allocation bus through a communication bus. The main control module controls to turn on the electric quantity transfer power receiving switch of the charging module of No. 2 battery, controls to turn on an electric energy allocation bus access switch of the power generation device, and keeps bus access switches of all other batteries and devices in an off state. At this moment, the power generation device supplies power to the electric energy allocation bus. The No. 2 battery receives the electric energy from the electric energy allocation bus. An electric energy flow direction in the electric energy allocation bus is a flow from the power generation device into No. 2 battery, thereby realizing electric energy transfer to charge the battery with the minimum remaining electric quantity in the battery pack by using the power generation device, i.e., the "valley filling" mode. A purpose of balancing the battery pack is achieved while charging the battery pack by using the power generation device.

In one embodiment, a basic electric energy transfer mode 2 of an electric energy allocation bus system: a "peak clipping" mode is provided, i.e., the electrical load is powered using a battery with the maximum remaining electric quantity in the battery pack through the electric energy allocation bus. When the electrical load needs to be started, it is assumed that the main control module judges that No. 4 battery has the maximum remaining electric quantity, and decides to power the electrical load by the No. 4 battery. The main control module controls whether each battery and device is accessed to the electric energy allocation bus through a communication bus. The main control module controls to turn on an electric energy allocation bus access switch of the electrical load through a communication bus, controls to turn on an electric quantity transfer power supply switch of the electric quantity transfer module of the No. 4 battery, and keeps bus access switches of all other batteries and devices in an off state. At this moment, No. 4 battery supplies power to the electric energy allocation bus. The electrical load receives the electric energy from the electric energy allocation bus. An electric energy flow direction in the electric energy allocation bus is a flow from No. 4 battery into the electrical load, thereby realizing electric energy transfer to supply power to the electrical load by using the battery with the maximum remaining electric quantity in the battery pack, i.e., the "peak clipping" mode, thereby achieving a purpose of balancing the battery pack, solving a problem of power supply to the load, and simultaneously avoiding an electric energy conversion loss in a process of converting high voltage output of the battery pack into low voltage through the DC-DC converter and then supplying power to the electrical load in a traditional mode.

In one embodiment, a basic electric energy transfer mode 3 of an electric energy allocation bus system: a "direct power supply" mode is provided, i.e., the electrical load is directly powered by using the power generation device. When the electrical load needs to be started, and when the power generation device can supply power externally and it is assumed that a difference among the remaining electric quantity of each battery at this moment is lower than start preset values of "valley filling" and "peak clipping", the main control module decides to supply power to the electrical load by using the power generation device. The main control module controls to turn on an electric energy allocation bus access switch of the electrical load through a communication bus, controls to turn on an electric energy allocation bus access switch of the power generation device, and keeps bus access switches of all other batteries in an off state. At this moment, the power generation device supplies power to the electric energy allocation bus. The electrical load receives the electric energy from the electric energy allocation bus. An electric energy flow direction in the electric energy allocation bus is a flow from the power generation device into the electrical load, thereby realizing electric energy transfer to supply power to the electrical load by using the power generation device, i.e., the "direct power supply" mode. Compared with a process in the prior art that the power generation device charges the battery pack firstly, i.e., converts electric energy into chemical energy, converts a high voltage output of the battery pack into low voltage through the DC-DC converter, and then supplies power to the electrical load, the "direct power supply" mode avoids two energy losses including an energy conversion loss caused by conversion between electric energy and chemical energy and an energy loss caused by conversion from high voltage to low voltage, reduces consumption of the cycle life of the battery, saves cost/weight/volume of the DC-DC converter, simultaneously enhances system reliability, prolongs the life of the battery pack and increases the endurance of the battery pack.

The smart battery and the electric energy allocation bus system of the present invention can be applied to any environment that needs to use the battery group, including but not limited to the following industries: electric bicycles, electric automobiles, electric mobile machinery shops, ships and submarines, battery energy storage systems of trains, backup power supply systems of machine rooms, backup battery packs of communication power supplies, battery packs of field mobile communication base stations, various battery pack energy storage systems including photovoltaic generation and wind power generation systems, battery pack systems of aerospace vehicles, battery pack systems of ships and submarines and other fields.

The smart battery has the positive significances of solving a problem of inconsistency in the charging process after grouping of the battery packs, cooperating with the electric energy allocation bus system, and realizing functions of active balanced charging, active balanced discharge and even individual power supply to the electrical load by the battery pack.

The electric energy allocation bus system has positive significances of fundamentally solving problems of overcharge and overdischarge of partial batteries in the battery pack in the charging and discharging processes due to inconsistent batteries in the power system of the battery pack, reducing charging and discharging cycles of the battery pack and reducing electric energy waste in the charging and discharging processes and a balancing process of the battery pack, thereby reducing sorting and purchasing cost of the battery pack, obviously prolonging the total cycle life of the battery pack, and increasing endurance of the battery pack.

In a third aspect of the present invention, the present invention provides a battery charging and discharging method, comprising charging and discharging the smart battery of the present invention. The present invention further discloses a battery charging and discharging method, comprising charging and discharging the smart battery group of the present invention through the electric energy allocation bus system of the present invention.

In one embodiment, a group of at least 2 smart batteries or a battery pack simultaneously provided with the electric energy allocation bus of the present invention is charged and discharged, charging and electric quantity transfer are performed as required.

In one embodiment, each battery is charged in the battery pack by using identical or different dynamically-adjustable charging parameters.

In one embodiment, controllable electric energy transfer is realized among the batteries, the power generation devices and the electrical loads in three modes of "valley filling", "peak clipping" and "direct power supply".

When used for charging and discharging the battery pack of the above smart battery group, the battery charging and discharging method in the present invention can realize complete control during charging due to support of historical and real-time data with the time stamps. With support of the electric quantity transfer function of the electric quantity transfer module, the method can also realize control during discharging.

One or a combination of several typical manners may be adopted during charging and discharging as follows:

1. full-charging: all the batteries are fully charged during charging. i.e., the batteries are charged according to a recommended charging curve of the batteries, or on a premise that the data for the monitoring the batteries, such as charging current/voltage/temperature/temperature rise and the like does not influence cycle life of the battery, i.e., on a premise of non overdischarge, each battery in the battery pack is charged with the maximum electric quantity;

2. overcharging: when an extreme command of the control system of the battery pack is received, if more discharge capacity of the battery pack is exchanged at the cost of sacrificing the cycle life of the battery pack, all or partial batteries are overcharged on a premise that the data for monitoring the batteries, such as the charging current/voltage/temperature/temperature rise and the like are in a battery safety range, thereby charging more electric quantity to achieve an aim of enabling the battery pack to discharge more electric quantities, such as for charging in a winter low-temperature environment or for meeting needs of users;

3. low-loss charging: it is a charging with an aim of improving an electric energy conversion rate. Other modules are decreased in operating frequencies, are dormant and even closed. Charging parameters are adjusted to reduce the power consumption of the charging module in the entire charging process. Precious energy is charged into the batteries as much as possible. For example, the charging method can be adopted when the battery pack is charged by using a mobile power supply;

4. balanced charging: the aim is not to fully charge each battery. A battery with a maximum last discharge depth in the battery pack is fully charged. The charging parameters (comprising voltage and current parameters at phases such as constant current, current limiting, constant voltage and the like) corresponding to each battery are dynamically adjusted with reference to the charged electric quantity and remaining electric quantity of the battery and historical discharge data (comprising discharge cutoff voltage during discharge cutoff of each of other batteries/remaining electric quantity and other data) of each of other batteries in the same group. The charged electric quantity of each battery is accurately controlled, thereby achieving an aim of enabling all or partial batteries to keep the same discharge depth during discharge cutoff of the battery pack. The charging method may be adopted when the electric quantity transfer module is not equipped in the battery pack; and 5. electric energy transfer: the electric quantity transfer module is started at proper time when the remaining electric quantity of each battery in the battery pack is inconsistent, and a battery with the maximum remaining electric quantity is used for charging a battery with the minimum remaining electric quantity, thereby realizing the electric quantity transfer from the battery with the maximum remaining electric quantity to the battery with the minimum remaining electric quantity, i.e., peak clipping and valley filling; or the electric quantity transfer is performed purposefully, and the remaining electric quantities of all or partial batteries in the battery pack are automatically adjusted to tend to be consistent, thereby realizing balanced discharging; or work of the power supply/power generation device accessed to the electric energy allocation bus system is controlled, and the battery with the minimum remaining electric quantity is charged, or a plurality of specified batteries are simultaneously charged, thereby realizing controllable electric quantity transfer; and the electric energy transfer can be performed in a standby or discharging state and even a series charging state of the battery pack.

In a fourth aspect of the present invention, the present invention discloses an electric energy allocation method, comprising realizing controllable electric energy transfer among the batteries, the power generation device and the electrical load accessed to the electric energy allocation bus system by adopting one or more methods of three electric energy transfer methods of "valley filling", "peak clipping" and "direct power supply" above through the electric energy allocation bus system.

A smart battery, an electric energy allocation bus system, a battery charging and discharging method and an electric energy allocation method disclosed in the present invention have beneficial effects as follows: when a battery pack grouped by the smart batteries is used, quantity of wiring and line diameter specifications in the system are reduced, data collection precision is improved, calculation accuracy of remaining electric quantity of the battery pack is improved, a health degree of each battery in the battery pack is accurately predicted, accurate prediction data is provided for maintenance of the battery pack, reliability and safety of the battery pack are improved, and using cost of the battery pack is reduced.

The entire charging and discharging processes are controllable and the remaining electric quantity of each battery can be reallocated as required, so as to fundamentally solve problems of overcharge and overdischarge of partial batteries in the battery pack in the charging and discharging processes due to inconsistent batteries, keep the same discharge depth of all batteries or specified some batteries in the battery pack, reduce charging and discharging cycles of the battery pack and greatly reduce standards during battery sorting and grouping, thereby obviously prolonging the total cycle life of the battery pack, reducing electric energy waste in the charging and discharging processes and a balancing process of the battery pack, increasing endurance of the battery pack and reducing purchasing cost of the battery pack.

DC-DC conversion devices are saved, thereby saving cost, volume and weight, reducing high-voltage circuits, and increasing system reliability and safety.

PREFERRED EMBODIMENTS OF THE INVENTION

Figure 10:
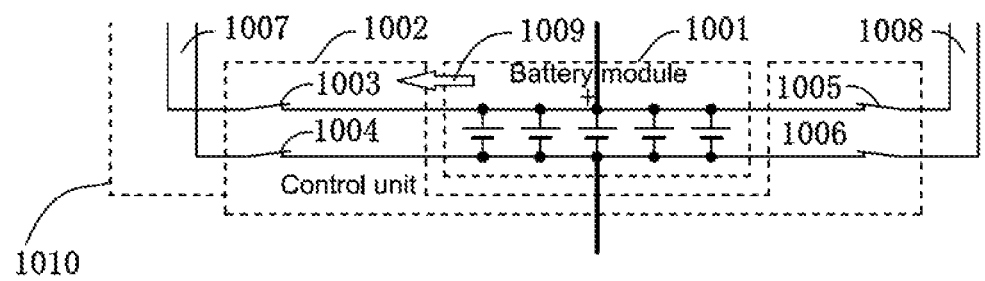
FIG. 10 is a schematic block diagram of basic components of a battery pack of an electric vehicle.
Figure 11:
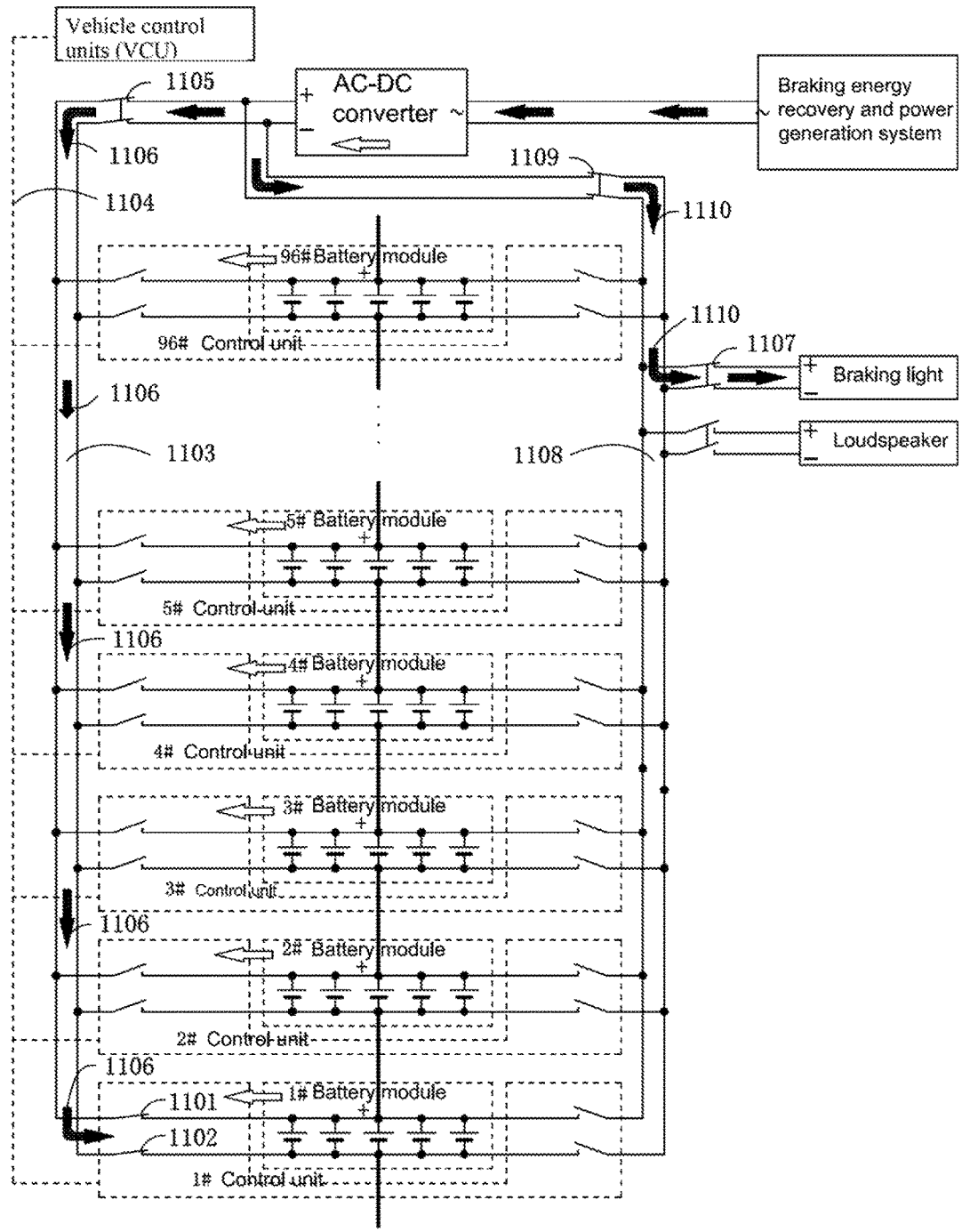
FIG. 11 is a schematic block diagram of an application 1 of an electric energy allocation bus on an electric vehicle.
Figure 12:
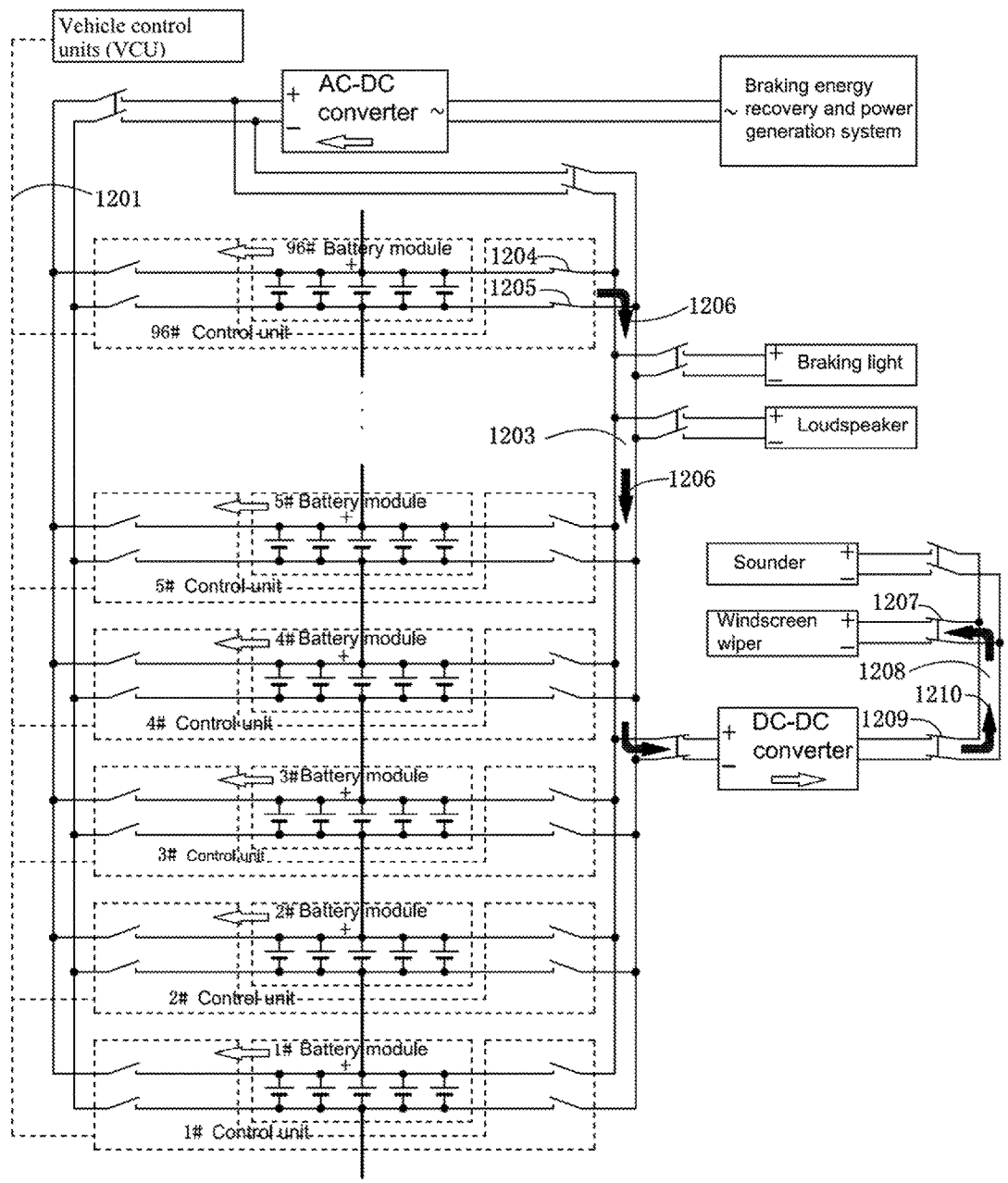
FIG. 12 is a schematic block diagram of an application 2 of an electric energy allocation bus on an electric vehicle.

With reference to FIG. 10 to FIG. 12, an application of an electric energy allocation bus on an electric vehicle is introduced.

FIG. 10 shows basic components of a battery pack of an electric vehicle, which is equivalent to dividing the smart battery shown in FIG. 1 to FIG. 5 in the present invention into 2 parts: a battery module 1001 and a control unit 1002. The battery module 1001 herein is formed by connecting 5 batteries in parallel, equivalent to a battery body portion of the smart battery. The function of the control unit 1002 is simplified. A charging module is cancelled, but switches 1003 and 1004 therein are reserved. An electric quantity transfer module is cancelled, but switches 1005 and 1006 therein are reserved. The control unit can control on-off of the switches 1003 and 1004 so that the battery module 1001 and the electric energy allocation bus 1007 are connected or disconnected. The control unit can control on-off of the switches 1005 and 1006 so that the battery module 1001 and the electric energy bus 1008 are connected or disconnected. A collection module in the control unit can collect data at least including voltage of the battery module 1001, such as voltage, current and temperature. For the collection function, a hollow arrow 1009 indicates a data flow direction. A communication module in the control unit can communicate with control units or vehicle control units (VCU) of other batteries through a communication bus 1010.

FIG. 11 shows an application 1 of an electric energy allocation bus on an electric vehicle. The battery pack is formed by connecting 96 battery modules in series. The electric vehicle is assumed to be in a braking state. At this moment, an equipped braking energy recovery and power generation system comes into operation, starts to generate power and provides alternating current to an AC-DC converter. An output end of the AC-DC converter outputs direct current. At this moment, the output end of the AC-DC converter can be regarded as a power generation device or a power supply device. Each control unit can collect the remaining electric quantity of each battery module in real time. The remaining electric quantity of No. 1 battery module at this moment is assumed to be minimal. No. 1 control unit controls to turn on the switches 1101 and 1102, access No. 1 battery module to the electric energy allocation bus 1103, notifies VCU through the communication bus 1104, controls to turn on the switch 1105 and accesses the output end of the AC-DC converter to the electric energy allocation bus 1103. At this moment, the AC-DC converter supplies power to the electric energy allocation bus 1103. The No. 1 battery receives the electric energy from the electric energy allocation bus 1103. An electric energy flow direction 1106 in the electric energy bus 1103 is a flow from the AC-DC converter into the No. 1 battery, thereby realizing electric energy transfer to charge the battery with the minimum remaining electric quantity in the battery pack by using the power generation device, i.e., the "valley filling" mode, so that the No. 1 battery module can keep the same discharge depth as other battery modules and the entire life of the battery pack can be prolonged. The output power of the AC-DC converter at this moment is assumed to be higher than an output power required by the No. 1 battery module. The VCU controls to turn on the switch 1107, accesses a braking light (which can be regarded as an electrical load) to the electric energy allocation bus 1108, controls to turn on the switch 1109 and accesses the output end of the AC-DC converter to the electric energy allocation bus 1108. At this moment, the AC-DC converter supplies power to the electric energy allocation bus 1108. The braking light receives the electric energy from the electric energy allocation bus 1108. An electric energy flow direction 1110 in the electric energy bus 1108 is a flow from the AC-DC converter into the braking light, thereby realizing electric energy transfer to supply power to the electrical load by using the power generation device, i.e., the "direct power supply" mode, so that two energy losses. i.e., an energy loss caused by conversion between electric energy and chemical energy and an energy loss caused by conversion from high voltage to low voltage of a DC-DC converter are avoided so as to increase endurance mileage of the electric vehicle. The DC-DC converter for switching high voltage to low voltage can be taken out of the system, thereby saving cost, volume and weight, reducing high-voltage circuits, increasing safety, increasing system reliability due to reduction of the number of devices, avoiding a charging and discharging process, reducing charging and discharging cycles of the battery pack and prolonging the cycle life of the battery pack.

FIG. 12 shows an application 2 of an electric energy allocation bus on an electric vehicle. The control units of all the battery modules send the collected remaining electric quantity data of each battery module to the VCU through the communication bus 1201. It is assumed that the remaining electric quantity of No. 96 battery module at this moment is maximal and a windscreen wiper needs to be started to operate at this moment. The VCU controls to turn on an input switch 1202 of the DC-DC converter, and accesses the DC-DC converter to the electric energy allocation bus 1203. No. 96 control unit controls to turn on the switches 1204 and 1205, and accesses No. 96 battery module to the electric energy allocation bus 1203. At this moment, No. 96 battery module supplies power to the electric energy allocation bus 1203. An input end of the DC-DC converter receives the electric energy from the electric energy allocation bus 1203. An electric energy flow direction 1206 in the electric energy bus 1203 is a flow from the No. 96 battery module into the DC-DC converter, wherein the input end of the DC-DC converter can receive the electric energy herein, and can be regarded as a load. The VCU controls to turn on the switch 1207, accesses the windscreen wiper to the electric energy allocation bus 1208, controls to turn on the switch 1209 and also accesses the output end of the DC-DC converter to the electric energy allocation bus 1208. Herein, the output end of the DC-DC converter can external supply power, and can be regarded as a power generation device or a power supply device. An electric energy flow direction 1210 in the electric energy allocation bus is a flow from the output end of the DC-DC converter into the windscreen wiper, thereby realizing power supply to the windscreen wiper by using the No. 96 battery finally, i.e., electric energy transfer to supply power to the load by using the battery with the maximum remaining electric quantity in the battery pack, i.e., the "peak clipping" mode, so that the remaining electric quantity of each battery module in the battery pack tends to be consistent, thereby achieving a purpose of balancing the battery pack and prolonging the cycle life of the battery pack.

The present invention is further described below according to drawings and specific embodiments. It should be understood that these drawings and embodiments are only used for illustrating purposes of the present invention, not to limit a scope of the present invention. Those skilled in the art can realize more functions or extend an application scope of the present invention according to principles described in the present invention through appropriate transformation and replacement.

Figure 1:
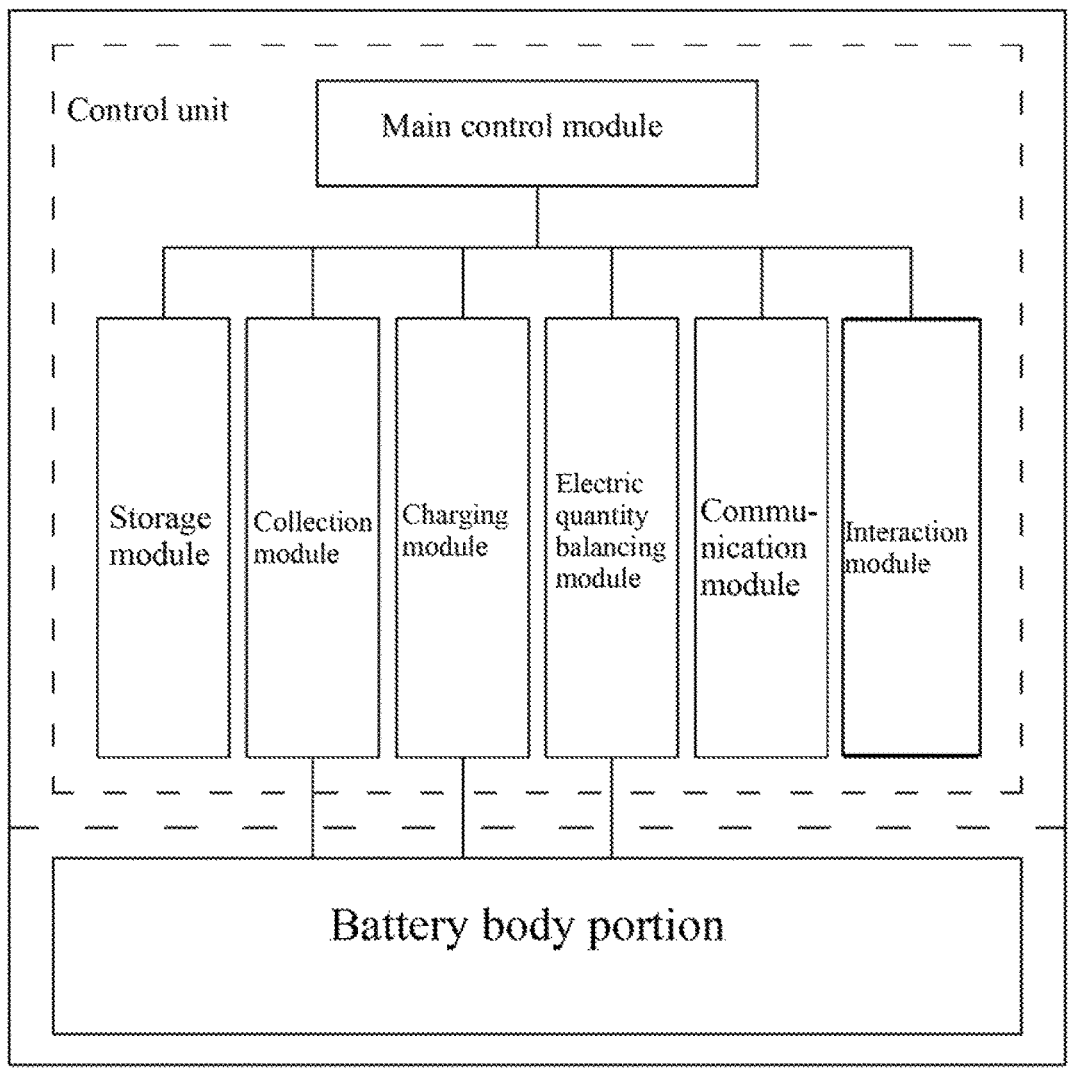
FIG. 1 is a structural schematic block diagram of a smart battery.

With reference to FIG. 1, a structural schematic block diagram of a smart battery of the present invention is described. The smart battery comprises a battery body portion, a control unit, a connecting line, a shell and a sensor (not shown), wherein the control unit comprises a main control module, a storage module, a collection module, a charging module, an electric quantity transfer module, a communication module and an interaction module.

Figure 2:
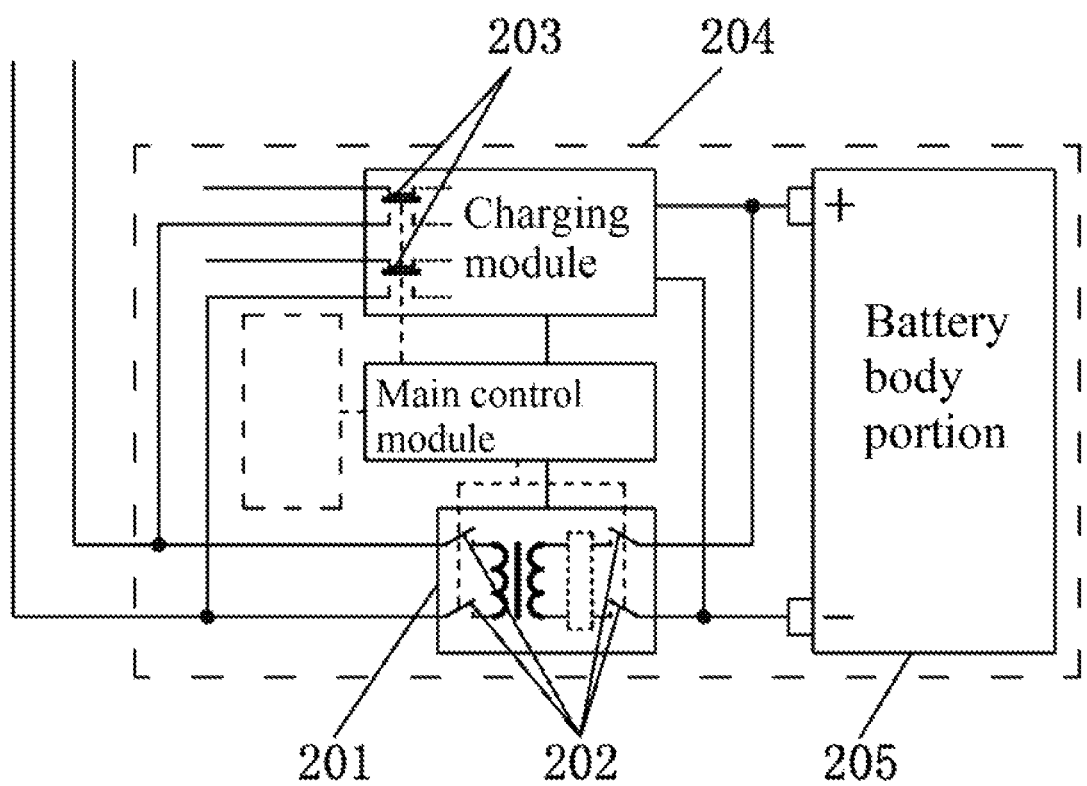
FIG. 2 is a schematic block diagram 1 of an electric quantity transfer module and a charging module of a smart battery.
Figure 3:
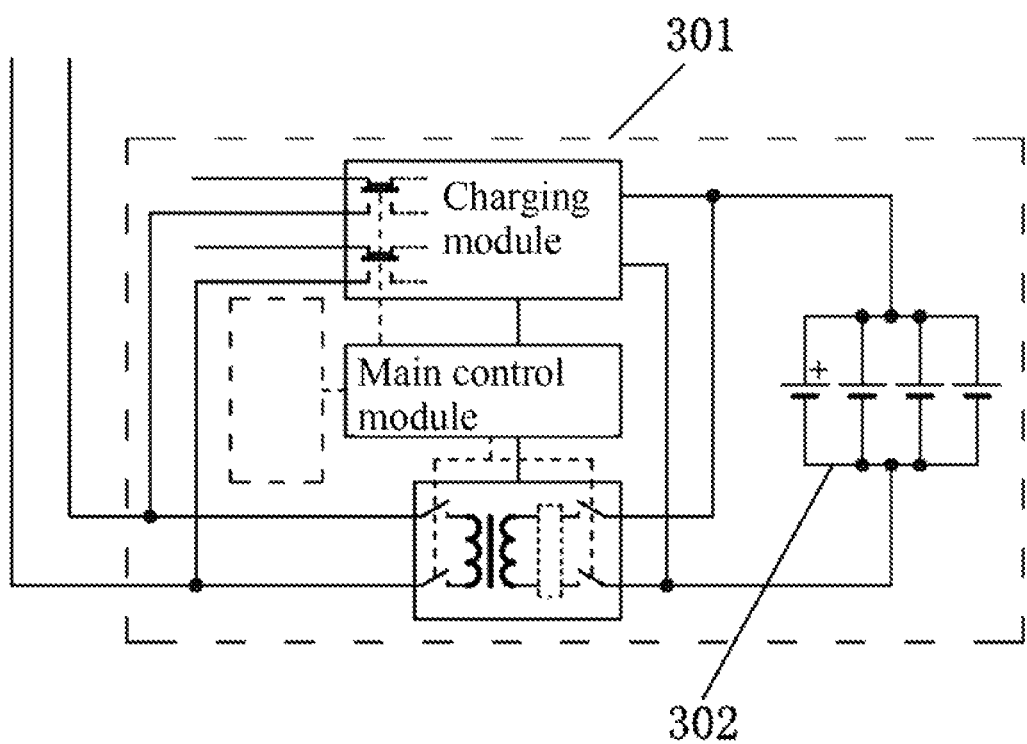
FIG. 3 is a schematic block diagram 2 of an electric quantity transfer module and a charging module of a smart battery.
Figure 4:
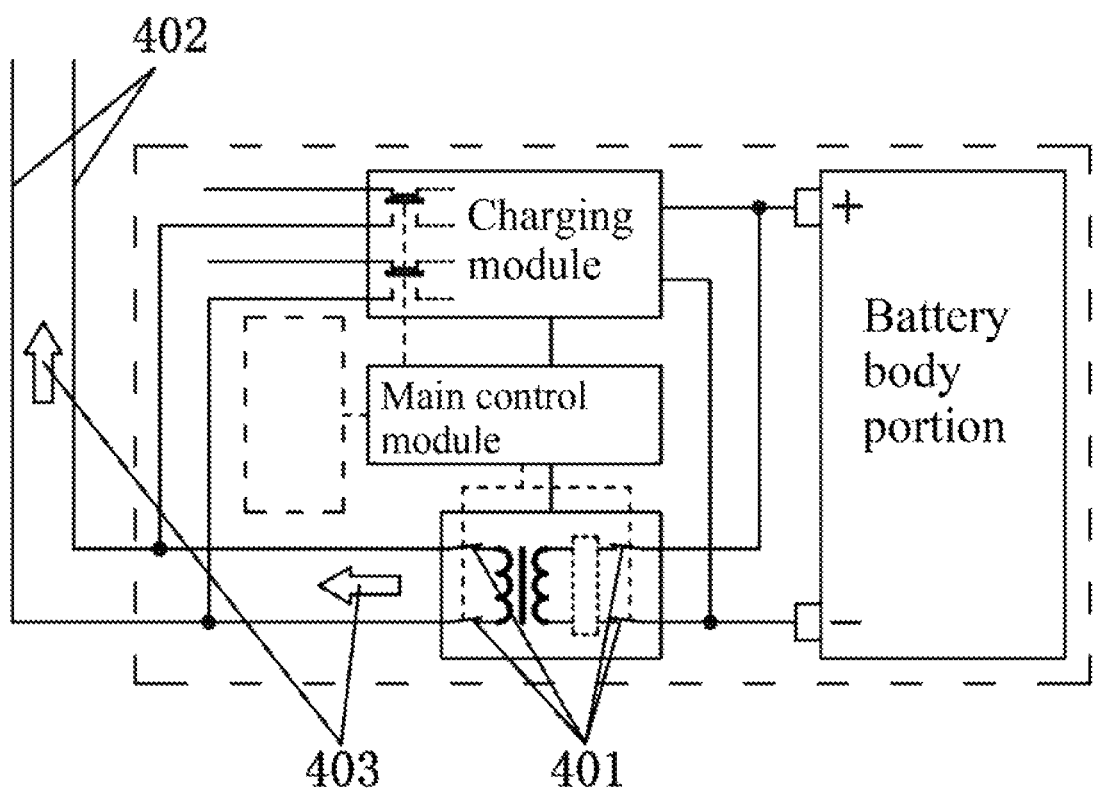
FIG. 4 is a schematic block diagram of external power supply through an electric quantity transfer module in a smart battery.
Figure 5:
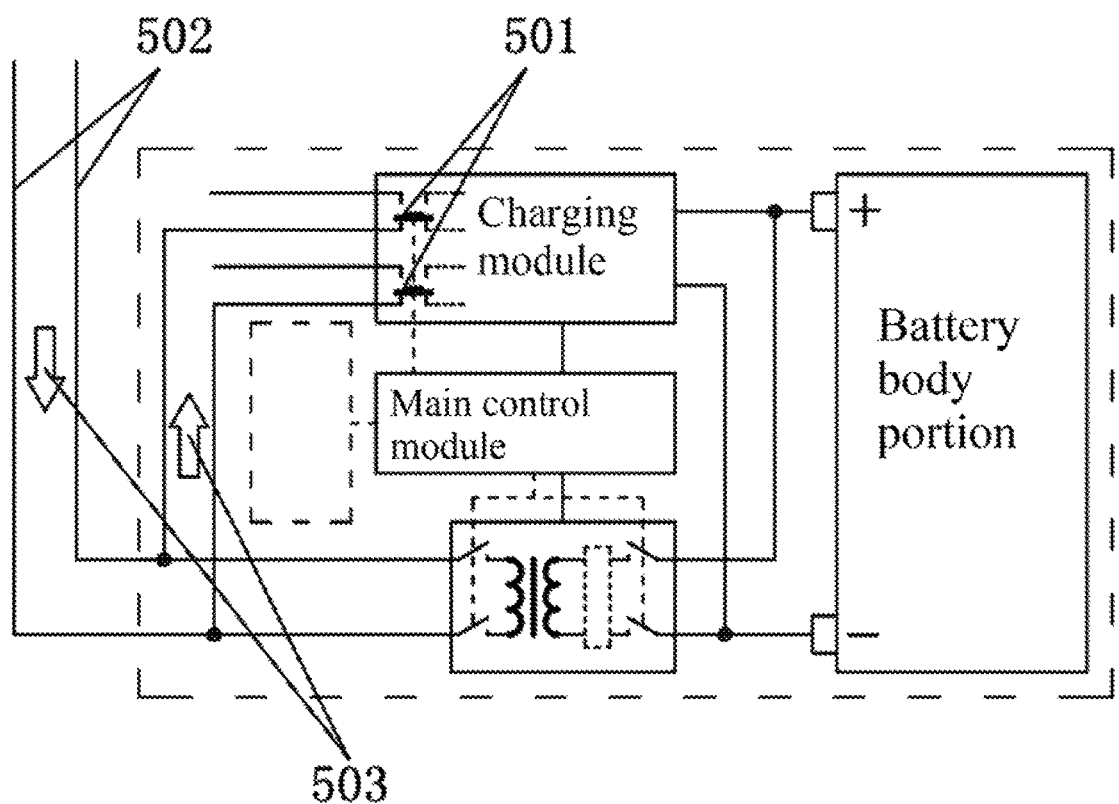
FIG. 5 is a schematic block diagram that a charging module receives electric energy from an electric energy allocation bus to charge in a smart battery.

With reference to FIG. 2 to FIG. 5, an operating mode of electric quantity transfer of the smart battery is introduced. When the battery does not participate in electric quantity transfer, as shown in FIG. 2 and FIG. 3, an electric quantity transfer power supply switch 202 of an electric quantity transfer module 201 is turned off. i.e., not operated, and an electric quantity transfer power receiving switch 203 of a charging module is also turned off, i.e., not operated, wherein the battery body portion 205 of the smart battery 204 comprises 1 battery. The battery body portion 302 of the smart battery 301 in FIG. 3 is a battery module formed by connecting 4 batteries in parallel. When the battery transfers electric quantity, i.e., supplies power, to other batteries or electrical loads accessed to the same electric energy allocation bus system, as shown in FIG. 4, an electric quantity transfer power supply switch 401 of the electric quantity transfer module is turned on. At this moment, electric energy flows out of the battery, as shown by an electric energy transfer direction 403 in the electric energy allocation bus 402 in FIG. 4. When the battery receives the electric quantity transferred to the battery by other batteries or power generation devices accessed to the same electric energy allocation bus system, i.e., charges the battery, as shown in FIG. 5, an electric quantity transfer power receiving switch 501 of the charging module is turned on, a power supply input of the charging module is switched to the electric energy allocation bus and the electric energy from the electric energy allocation bus is received to charge the battery. At this moment, the electric energy flows in the battery, as shown by an electric energy transfer direction 503 in the electric energy allocation bus 502 in FIG. 4.

Figure 6:
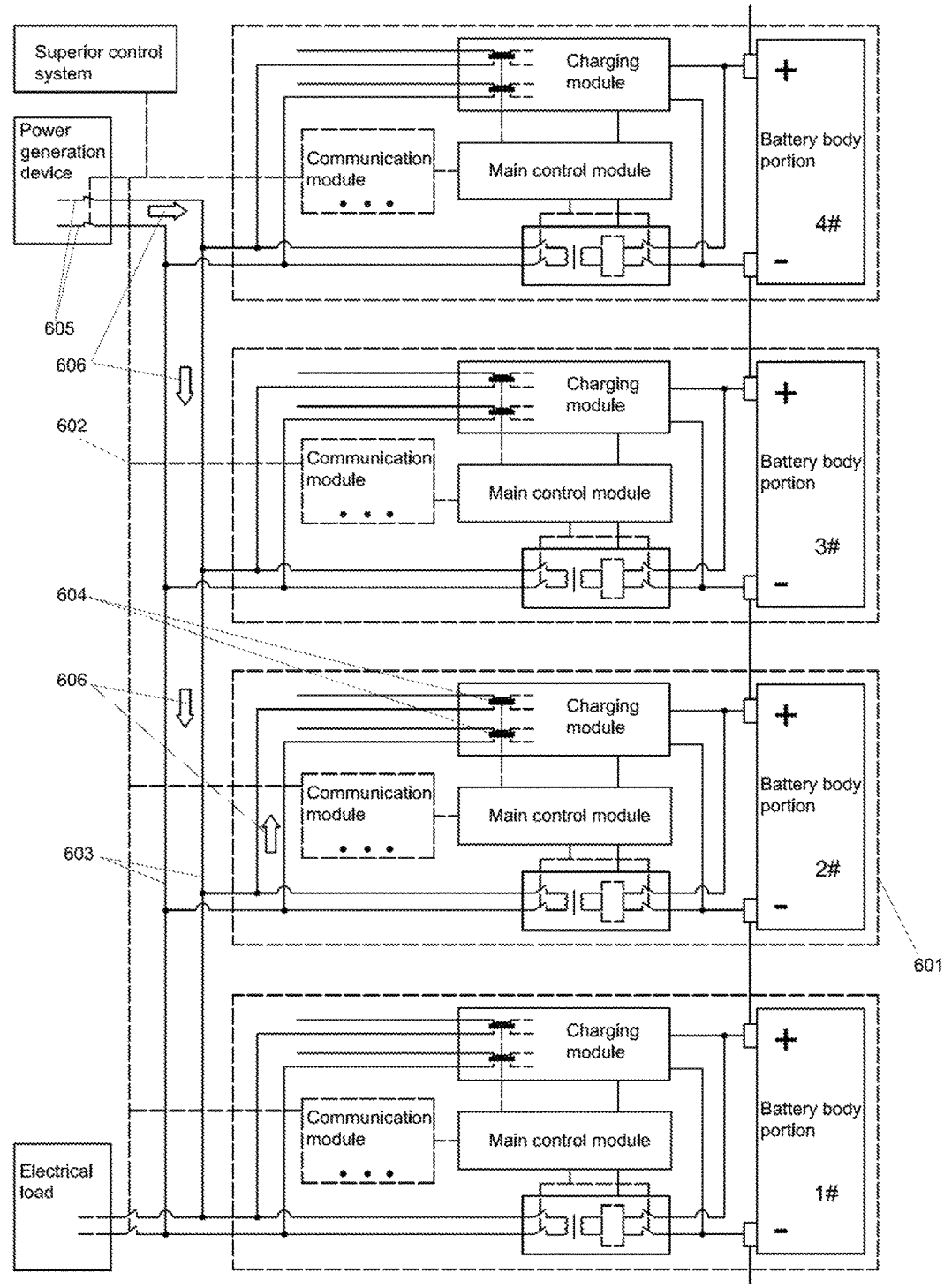
FIG. 6 is a basic electric energy transfer mode 1 of an electric energy allocation bus system: a schematic block diagram of a "valley filling" mode.
Figure 7:
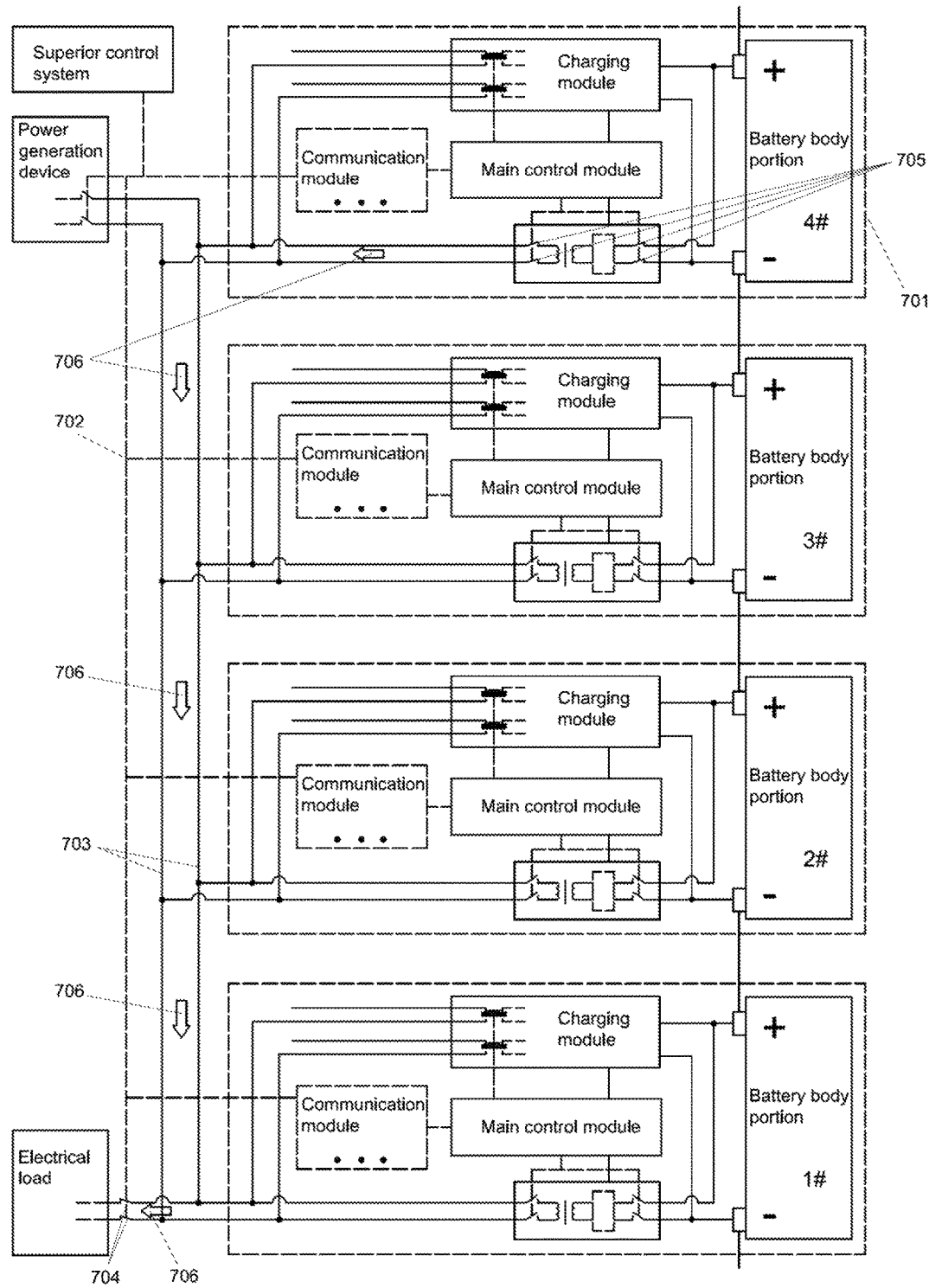
FIG. 7 is a basic electric energy transfer mode 2 of an electric energy allocation bus system: a schematic block diagram of a "peak clipping" mode.
Figure 8:
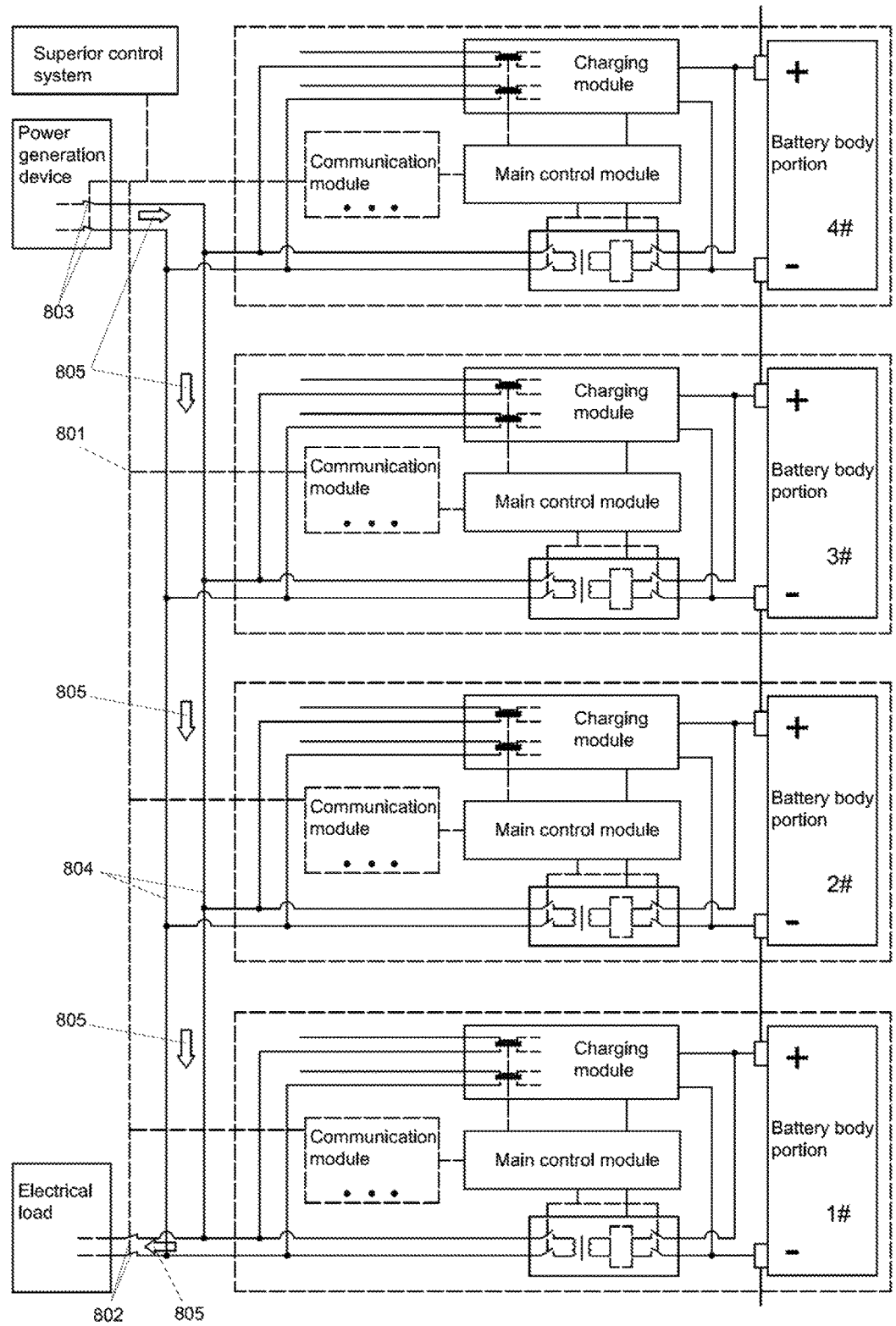
FIG. 8 is a basic electric energy transfer mode 3 of an electric energy allocation bus system: a schematic block diagram of a "direct power supply" mode.

With reference to FIG. 6 to FIG. 8, three basic electric energy transfer modes of the electric energy allocation bus system are introduced, i.e., "valley filling". "peak clipping" and "direct power supply".

FIG. 6 shows the "valley filling" electric energy transfer mode of the electric energy allocation bus system, i.e., a battery with the minimum remaining electric quantity in the battery pack is charged by using the power generation device through the electric energy allocation bus. When the power generation device can provide electric energy, it is assumed that the main control module judges that No. 2 battery 601 has the minimum remaining electric quantity, and decides to charge the No. 2 battery 601 by the power generation device. The main control module controls whether each battery and device is accessed to the electric energy allocation bus 603 through a communication bus 602. The main control module controls to turn on the electric quantity transfer power receiving switch 604 of the charging module of No. 2 battery 601, controls to turn on an electric energy allocation bus access switch 605 of the power generation device, and keeps bus access switches of all other batteries and devices in an off state. At this moment, the power generation device supplies power to the electric energy allocation bus 603. The No. 2 battery 601 receives the electric energy from the electric energy allocation bus. An electric energy flow direction 606 in the electric energy allocation bus 603 is a flow from the power generation device into No. 2 battery 601, thereby realizing electric energy transfer to charge the battery with the minimum remaining electric quantity in the battery pack by using the power generation device, i.e., the "valley filling" mode.

FIG. 7 shows a "peak clipping" electric energy transfer mode of the electric energy allocation bus system. i.e., the electrical load is powered using a battery with the maximum remaining electric quantity in the battery pack through the electric energy allocation bus. When the electrical load needs to be started, it is assumed that the main control module judges that No. 4 battery 701 has the maximum remaining electric quantity, and decides to power the electrical load by the No. 4 battery 701. The main control module controls whether each battery and device is accessed to the electric energy allocation bus 703 through a communication bus 702. The main control module controls to turn on an electric energy allocation bus access switch 704 of the electrical load, controls to turn on an electric quantity transfer power supply switch 705 of the electric quantity transfer module of the No. 4 battery 701, and keeps bus access switches of all other batteries and devices in an off state. At this moment, No. 4 battery 701 supplies power to the electric energy allocation bus 703. The electrical load receives the electric energy from the electric energy allocation bus 703. An electric energy flow direction 706 in the electric energy allocation bus 703 is a flow from No. 4 battery 701 into the electrical load, thereby realizing electric energy transfer to supply power to the electrical load by using the battery with the maximum remaining electric quantity in the battery pack, i.e., the "peak clipping" mode.

FIG. 8 shows the "direct power supply" electric energy transfer mode of the electric energy allocation bus system, i.e., the electrical load is directly powered by using the power generation device. When the electrical load needs to be started, and when the power generation device can supply power externally and it is assumed that a difference among the remaining electric quantity of each battery at this moment is lower than start preset values of "valley filling" and "peak clipping", the main control module decides to supply power to the electrical load by using the power generation device. The main control module controls to turn on an electric energy allocation bus access switch 802 of the electrical load through a communication bus 801, controls to turn on an electric energy allocation bus access switch 803 of the power generation device, and keeps bus access switches of all other batteries in an off state. At this moment, the power generation device supplies power to the electric energy allocation bus 804. The electrical load receives the electric energy from the electric energy allocation bus 804. An electric energy flow direction 805 in the electric energy allocation bus 804 is a flow from the power generation device into the electrical load, thereby realizing electric energy transfer to supply power to the electrical load by using the power generation device, i.e., the "direct power supply" mode.

Figure 9:
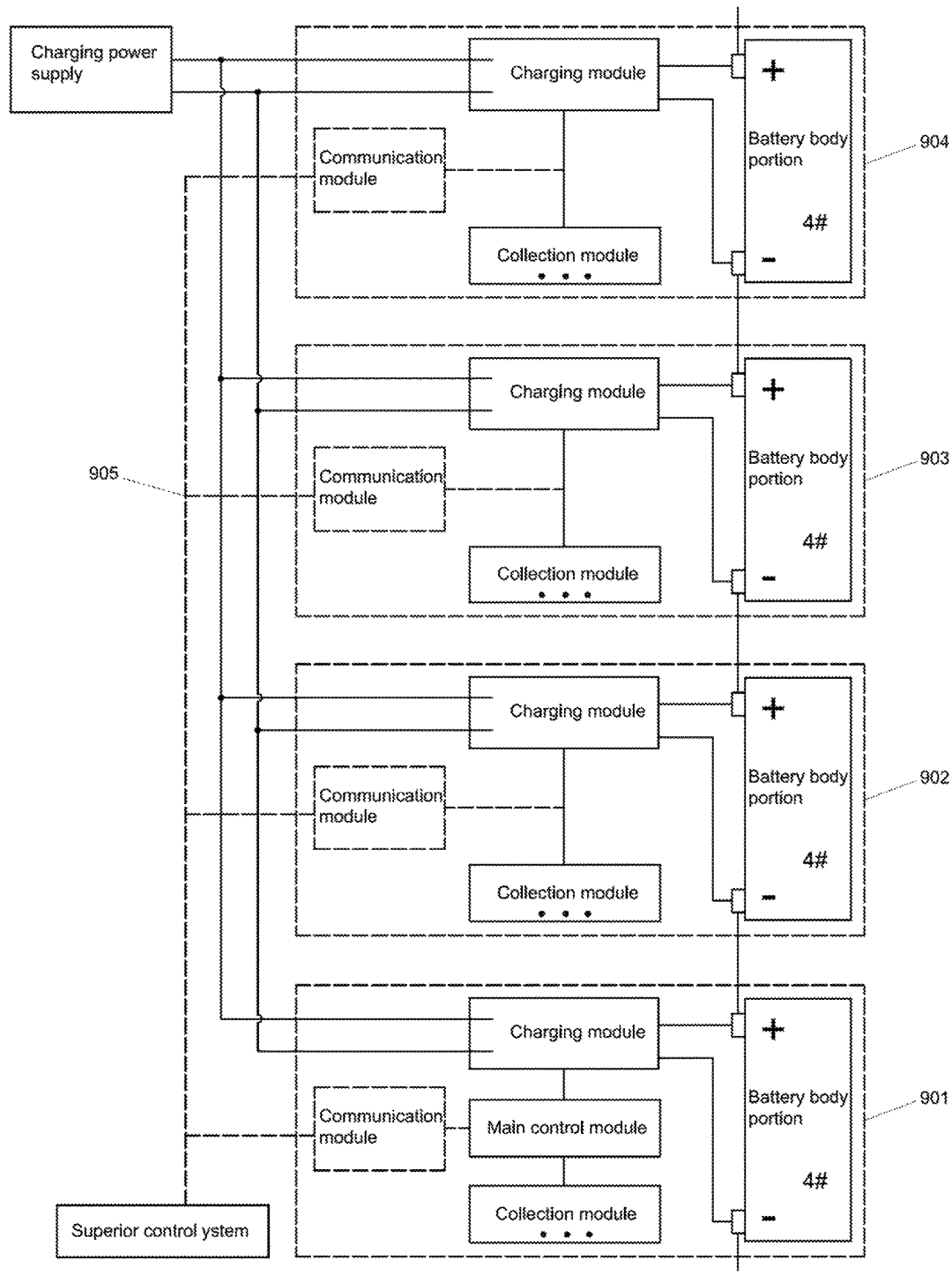
FIG. 9 is a schematic block diagram of a stripped-down smart battery group.

FIG. 9 shows a schematic block diagram of a stripped-down smart batten group, wherein 4 smart batteries are connected in series to form a group, i.e., No. 1 battery 901, No. 2 battery 902, No. 3 battery 903 and No. 4 battery 904. Potentials of 4 batteries in the battery pack are from low to high. No electric energy allocation bus is arranged in the battery pack. No electric quantity transfer module is included in each of the smart battery. Only No. 1 battery 901 is provided with the main control module. The communication modules and the superior control system of all the batteries are connected together through the communication bus 905. The main control module acquires the data of all the batteries and interaction command information of the superior control system in real time through the collection module and the communication module, computes the charging parameter of each battery during charging according to real-time data such as deterioration degree, remaining electric quantity and the like of each battery, transmits the charging parameters to each battery, adjusts the charging parameter of each battery according to acquired latest information, and uses one or a combination of the following charging solutions:

1. fully charging a charging curve according to a recommendation of the battery;

2. using different charging parameters for each battery and dynamically adjusting the charging parameters so that each battery keeps the same discharge depth at the end of the next discharge;

3. receiving a command of the superior control system for charging maximum electric quantity, i.e., overcharging partial or all batteries within bearable safety ranges of the temperature and temperature rise of a monitoring battery; and 4. reducing power consumption, dormancy and even closing except for the charging module due to limited energy when a charging power supply is a portable power supply, and minimizing the power consumption of the charging module in the entire charging process to change the charging parameters of the charging module so as to increase the electric quantity charged into the battery as much as possible.

Embodiment 1

A fully configured smart battery, as shown in a structural schematic block diagram of a smart battery of FIG. 1, comprises a battery body portion, a control unit, a connecting line and a shell, and also comprises a sensor and an interface (not shown), wherein the control unit comprises a main control module, a storage module, a collection module, a charging module, an electric quantity transfer module, a communication module and an interaction module.

Embodiment 2

A fully configured smart battery group, formed by connecting 4 smart batteries in series, as shown in FIG. 6 to FIG. 8, comprises No. 1 battery, No. 2 battery, No. 3 battery and No. 4 battery. Potentials of 4 batteries in the battery pack are from low to high. The fully configured smart battery group also comprises an electric energy allocation bus, a power generation device, an electrical load, a superior control system and a communication bus.

Embodiment 3

A stripped-down smart battery group, formed by connecting 4 smart batteries in series, as shown in FIG. 9, comprises No. 1 battery 901, No. 2 battery 902. No. 3 battery 903 and No. 4 battery 904. Potentials of 4 batteries in the battery pack are from low to high. No electric energy allocation bus is arranged in the battery pack. No electric quantity transfer module is included in each of the smart battery. Only No. 1 battery 901 is provided with the main control module. The communication modules and the superior control system of all the batteries are connected together through the communication bus 905.

Although the present invention is described in detail above through general illustration and specific embodiments, some modifications or improvements can be made to the present invention on the basis of the present invention. This is apparent for those skilled in the art. For example, the control unit and the battery body portion of the smart battery are separated to become a split battery, or three basic electric energy transfer modes of the electric energy allocation bus are combined, and the like. Therefore, these modifications or improvements made without departing from spirits of the present invention belong to a protection scope of the present invention.

INDUSTRIAL APPLICABILITY

The smart battery and the electric energy allocation bus system of the present invention can be applied to any environment that needs to use the battery group, including but not limited to the following industries: electric bicycles, electric automobiles, electric mobile machinery shops, ships and submarines, battery energy storage systems of trains, backup power supply systems of machine rooms, backup battery packs of communication power supplies, battery packs of field mobile communication base stations, various battery pack energy storage systems including photovoltaic generation and wind power generation systems, battery pack systems of aerospace vehicles, battery pack systems of ships and submarines and other fields.

What is claimed is:

1. A smart battery used independently, or in series group, comprising:
   a control unit comprising:
   (1) a main control module for coordinating cooperative work of various modules of the smart battery, coordinating work of all modules of other smart batteries in a same group and connected power generation devices/electrical loads through a communication interface, communicating with a superior control system of a battery pack, reporting data of the battery pack, and receiving and executing commands of the superior control system of the battery pack;
   (2) a charging module for executing a charging command issued directly by the main control module, charging the smart battery according to supplied charging parameters, and adjusting the supplied charging parameters in real time according to received latest charging parameters;
   (3) an electric quantity transfer module for externally supplying power by using electric energy of the smart battery under control of the main control module; and
   (4) a communication module for transmitting data between smart batteries of the same group, between the battery pack and the superior control system of the battery pack and between a power generation devices or electrical loads accessed to communication buses and the smart battery;
   a battery body portion;
   a connecting wire;
   a sensor; and
   a shell,
   wherein the control unit is configured to control coordinately, acquire information, analyze statistic, control actively and give external feedback;
   when controlling coordinately, the control unit coordinates and controls cooperative work of other smart batteries in a battery pack and power generation devices or electrical loads accessed to a same electric energy allocation bus through a communication interface, including: keeping clocks of all smart batteries synchronous and keeping synchronous with a clock of a superior control system of the battery pack, coordinating and determining a control unit of a certain smart battery in the battery pack, coordinating data collection and transmission of other smart batteries, coordinating calibration of data collection precision of all the batteries in the battery pack, controlling data collection types and frequencies of all batteries, upgrading programs of the control unit, and performing self-tests of the control unit of each battery;
   when acquiring information, the control unit is further configured to: acquire information of the battery, including voltage, current, internal resistance, temperature, environmental temperature, motion states, vibration and acceleration data through a data collection function of the control unit, acquire above information of each of other smart batteries in the same group and clock/self-test/calibration information through a communication function of the control unit, acquire voltage/current data on the electric energy allocation bus, acquire external interaction commands and environmental temperature information through the communication function of the control unit, and add time stamps on all above information and store the information;

when analyzing the statistic, the control unit is configured to count, analyze and compute the number of charging and discharging cycles of each battery in the battery pack, charging and discharging depth, remaining electric quantity and deterioration degree according to the acquired information, compute charging parameters suitable for each battery according to commands, compute power supply and electricity use information accessed to the electric energy allocation bus for switching different batteries and/or power generation devices and/or electrical loads to access to the electric energy allocation bus or disconnect from the electric energy allocation bus, and add time stamps on all above information and stores the information;

when control actively, the control unit is configured to perform electric quantity transfer among the batteries belonging to a same group to realize a reallocation of the remaining electric quantity among all the batteries, or to charge partial or all the batteries in the battery pack through the power supply devices accessed to the electric energy allocation bus, switch corresponding batteries and/or power generation devices and/or electrical loads to access to the electric energy allocation bus or disconnect from the electric energy allocation bus according to a statistic analysis result; the control unit is configured to adjust charging parameters dynamically based on a statistic analysis computation result and the external commands;

when giving external feedback, the control unit passively answers the external interaction commands or actively issues information to an outward;

the control unit adopts a full-time charging mode or a time-sharing charging mode; wherein the full-time charging mode is to complete charging by the control unit in an entire charging process, and the time-sharing charging mode is to complete the entire charging process; and the smart battery comprises connecting wires, a positive leading wire and a negative leading wire of the battery body portion are respectively connected with a positive binding post and a negative binding post of the shell of the smart battery, and an overload protection apparatus and a current sensor are installed on a connecting circuit; a positive output end and a negative output end for charging function and an input end for electric quantity transfer function in the control unit are respectively connected with the positive leading wire and the negative leading wire of the battery body portion; and the current sensor is installed on the connecting circuit;

the main control module is directly connected to the charging module, the communication module and the electric quantity transfer module, respectively;

the charging module and the electric quantity transfer module are in parallel connections to both the electric energy allocation bus and the battery body portion; and the main control module, the charging module, the communication module and the electric quantity transfer module are separate and distinct hardware components.

2. The smart battery of claim 1, wherein the battery body portion is a battery or a battery module formed by more than two batteries.

3. The smart battery of claim 1, wherein the smart battery comprises an integrated or split shell; the control unit, the battery body portion, the connecting wire and the sensor are combined together; the shell is provided with exposed positive binding post and negative binding post and a plurality of interfaces, including partial or all interfaces such as an environmental temperature sensor interface, a power supply interface, an electric energy allocation bus interface, a heat dissipation interface, a calibration interface, a communication interface and a program upgrade interface; all interfaces are independent or combined into one interface.

* * * * *